Sept. 18, 1945.  E. A. LINK  2,385,291
TRAINING DEVICE
Filed July 5, 1943  4 Sheets-Sheet 1

FIG. 1

EDWIN A. LINK
*INVENTOR.*

BY
ATTORNEYS.

Sept. 18, 1945. E. A. LINK 2,385,291
TRAINING DEVICE
Filed July 5, 1943 4 Sheets-Sheet 2

FIG. 2

EDWIN A. LINK
INVENTOR.

BY
ATTORNEYS.

Sept. 18, 1945.  E. A. LINK  2,385,291
TRAINING DEVICE
Filed July 5, 1943   4 Sheets-Sheet 4

EDWIN A. LINK
INVENTOR.

ATTORNEYS.

Patented Sept. 18, 1945

2,385,291

UNITED STATES PATENT OFFICE 2,385,291

TRAINING DEVICE

Edwin A. Link, Binghamton, N. Y.

Application July 5, 1943, Serial No. 493,535

16 Claims. (Cl. 35—12)

My invention relates to training devices and more particularly to a training device for the instruction of aviators and is a continuation in part of my copending application Serial No. 250,958 filed January 14, 1939. This copending application discloses a navigation training apparatus having means for projecting upon a screen a moving image representing a portion of the earth's surface, whereby valuable training in navigation may be received by the use of such apparatus. This patent is intended to secure protection to me of only the improvements made over my earlier application, and all of the claims of this patent are restricted to such improvements.

A primary object of my invention is to improve generally the means disclosed in my copending application for simulating in a grounded aviation trainer flight over a part of the earth's surface.

It is a further object of my invention to provide a terrain screen attached to the trainer for rotation therewith synchronized with a terrain projecting apparatus which responds to the movements of the trainer and terrain screen so as to make the path of the images upon the terrain screen move with respect to the trainer in simulation of the movement of the ground with respect to a plane in actual flight.

It is a further object of my invention to provide means whereby a terrain plate having a print of any strip of the earth's surface taken in any direction may be used in conjunction with the trainer in order to simulate flight in any direction of a real plane over the corresponding ground.

It is a further object of my invention to provide a terrain plate and screen and projecting system to be used in conjunction with a wind drift instrument of the type disclosed in the copending application Serial Number 406,056 filed August 8, 1941.

Other objects of my invention will become apparent as the description proceeds, reference now being made to the accompanying figures which show a preferred embodiment of the invention.

Figure 1:
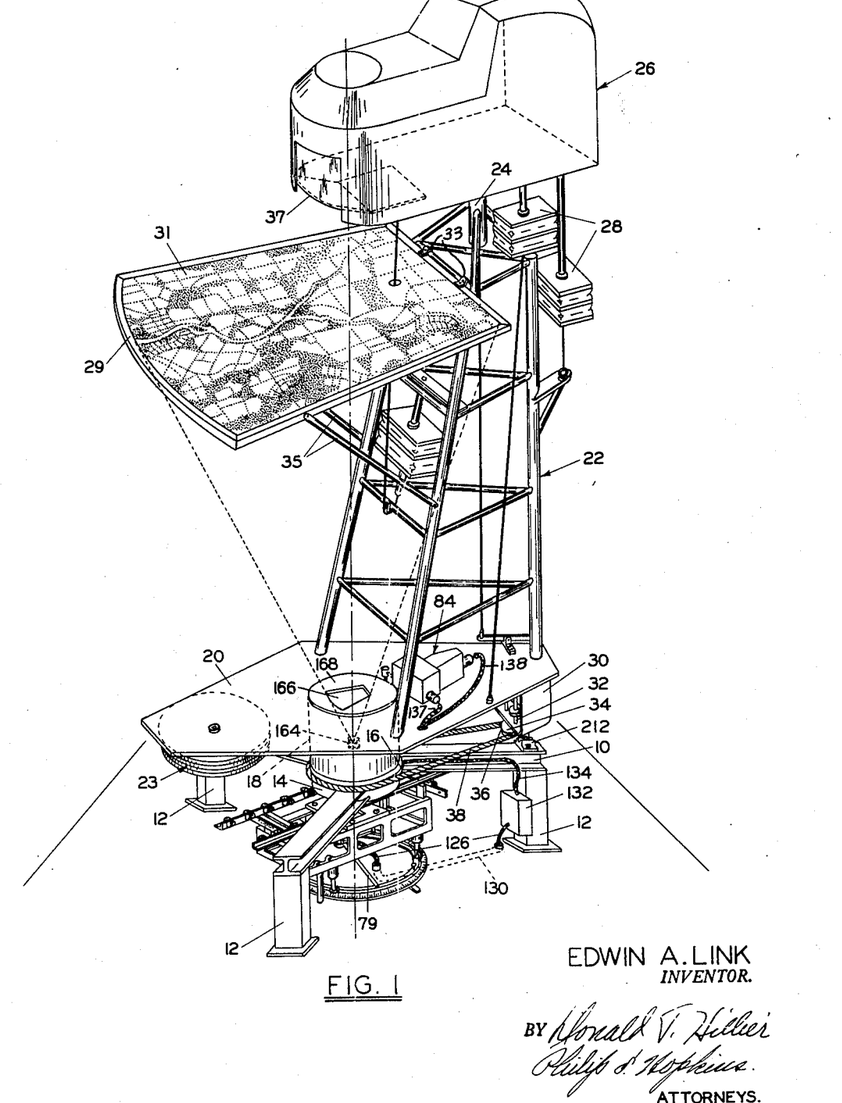
Fig. 1 is a general side view of the trainer showing the fuselage, terrain screen and terrain mechanism.

Reference is now made to Fig. 1 which shows a base frame 10 resting upon three upstanding supports 12. A lower bearing housing 14 is fixedly attached to base frame 10 and formed integrally with this lower bearing housing is an annular groove 16. Upper bearing housing 18 is held by lower bearing housing 14 and is rotatable with respect thereto by virtue of a suitable bearing arrangement. Fixedly attached to upper bearing housing 18 and resting thereupon is platform 20 upon which is mounted a tower 22 having three main upstanding legs. The central upper member 24 affixed to tower 22 has at its upper end a universal joint (not shown) and the trainer fuselage 26 rests upon the top of this universal joint. By means of a system of vacuum, valves, linkages and bellows 28 the trainer fuselage 26 may be made to assume a diving, climbing or banking position, in simulation of the corresponding movements of a plane in actual flight. The detailed means of accomplishing these movements of trainer fuselage 26 upon the universal joint are described in detail in U. S. Patents 1,825,462 and 2,099,857, and therefore, a detailed description in this application is not deemed necessary.

A frame 29 holds the terrain screen 31 which is preferably made of silk and the frame is affixed to one of the cross pieces of the tower 22 by means of clamps 33. The outer ends of the screen are supported by arms 35 which have one end attached to the sides of the frame 29 and their other ends attached to one of the legs of the tower 22. A portion 37 of the floor of the fuselage 26 is transparent in order that the image upon the screen may be viewed from inside fuselage 26. A plurality of weights 23 counterbalance the fuselage upon upper bearing housing 18.

Still referring to Fig. 1 it will be seen that depending from platform 20 and rigidly affixed thereto is a turning motor 30 which has an output shaft 32 upon which is rigidly affixed a pulley wheel 34 having a groove 36 adapted to receive turning belt 38. It is also to be noticed that turning belt 38 is placed in the groove 16 integral with lower bearing housing 14.

Whenever the student in the trainer presses the rudder pedals (not shown) the turning motor 30 is actuated by a system of vacuum, valves and linkages also described in the two abovementioned U. S. patents, and the output shaft 32 and wheel 34 are rotated, the direction of rotation depending upon whether the left or right rudder pedal is pressed. In the event the left rudder pedal is pressed the wheel 34 is rotated clockwise as seen in Fig. 1, and because of the friction between turning belt 38 and wheel 34 on the one hand and the friction between turning belt 38 and groove 16 on the other, the wheel 34 rolls along turning belt 38, carrying with it turning motor 30, platform 20, tower 22, screen 31 and fuselage 26, thereby causing the front of the fuselage 26 to turn to the left. In the event the right rudder pedal is pressed the direction of rotation of wheel 34 is counterclockwise and the turning motor 30, platform 20, tower 22, screen 31 and fuselage 26 are rotated in the opposite direction. It will be realized, of course, that this rotation is accomplished by virtue of the fact that base frame 10, its supports 12, lower bearing housing 14 and annular groove 16 are fixed while turning motor 30, platform 20 and the parts mounted thereupon are rotatable with respect to these fixed parts. Turning belt 38 is the means connecting the rotatable and fixed parts.

Figure 2:
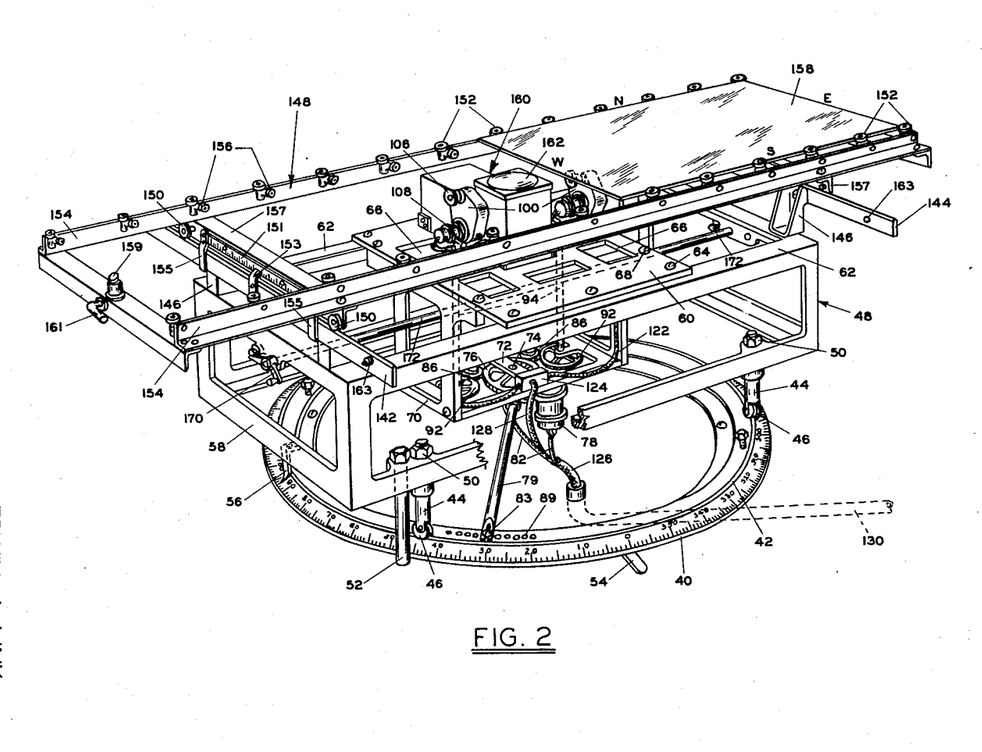
Fig. 2 is a general perspective view of the terrain mechanism.

Reference is now made to Fig. 2 which shows the mechanism of this invention which is used to project the image of the ground upon the terrain screen 31. As seen in Fig. 2, an azimuth rail 40 in the form of a large ring is provided, the rail being graduated from zero through 360° in a clockwise direction. A track 42 is formed integrally with the azimuth rail and riding upon this track by means of four vertical legs 44 having flanged rollers 46 mounted in their lower ends is the terrain base frame 48. The legs 44 are rigidly held by frame 48 by means of lock nuts 50. Also rigidly held by terrain base frame 48 is a depending stop 52 which, when the frame is correctly positioned with respect to the azimuth rail 40, engages a pivoted arm 54. This arm is pivotally affixed to azimuth rail 40 which has an integral stop (not shown) on each side of the arm 54. The limited movement of arm 54 resulting from this arrangement allows the positioning of terrain base frame 48 at any position through 360° but prevents a continuous rotation of the terrain frame 48 in order that certain electrical connections to be later described will not become disrupted. A pointer 56 is rigidly affixed to the end 58 of the frame 48 and, therefore, indicates at all times the rotatable position of terrain base frame 48.

Figure 3:
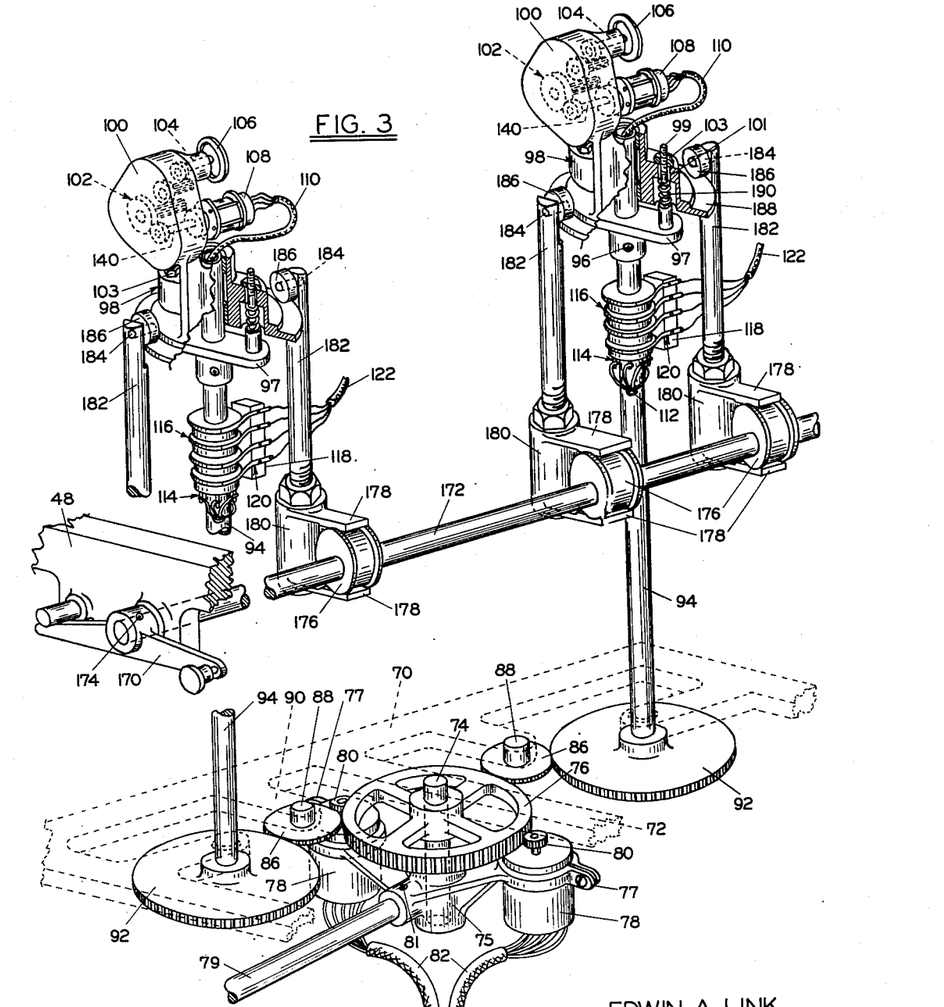
Fig. 3 is an enlarged view of certain parts of the terrain mechanism.

Also seen in Fig. 2 is a horizontal member 60 which is affixed to the upper longitudinal members 62 of the terrain base frame 48 by means of bolts 64. Casting 60 has a plurality of rectangular openings 66 in order to lighten the unit. Depending from member 60 and rigidly affixed thereto by means of bolts 68 is a boxlike frame 70 which has a lower cross piece 72. As seen in Figs. 2 and 3 a shaft 74 is rigidly held by this cross piece and rotatably mounted thereupon is a large spur gear 76. There are mounted adjacent gear 76 two receiver teletorques 78 each of which has affixed upon its output shaft a pinion 80 which meshes with gear 76 in order that they may rotate this gear. These teletorques are designated in the art as the track receiving teletorques. It will be seen that the wires contained in cables 82 connect with each of these teletorques and that cables 82 merge into a larger cable 126 which enters underground conduit 130 and connects with a junction box 132 on one of the legs 12. From junction box 132 cable 134 carries the electrical connections to housings 14 and 18 where the electrical transfer is made by means of slip rings and brushes (not shown). Cable 137 connects with the brushes and slip rings and goes to the track transmitting teletorque 85 of the wind drift instrument 84. By the previously described electrical connections track transmitting teletorque 85 is connected to the track receiving teletorques 78. The nature of these teletorques is such that when the input shaft 87 of the track transmitting teletorque 85 is rotated through a given angle the output shafts and the pinions 80 of the track receiving teletorques are rotated through the same angle and in the same direction.

Figures 4, 5:
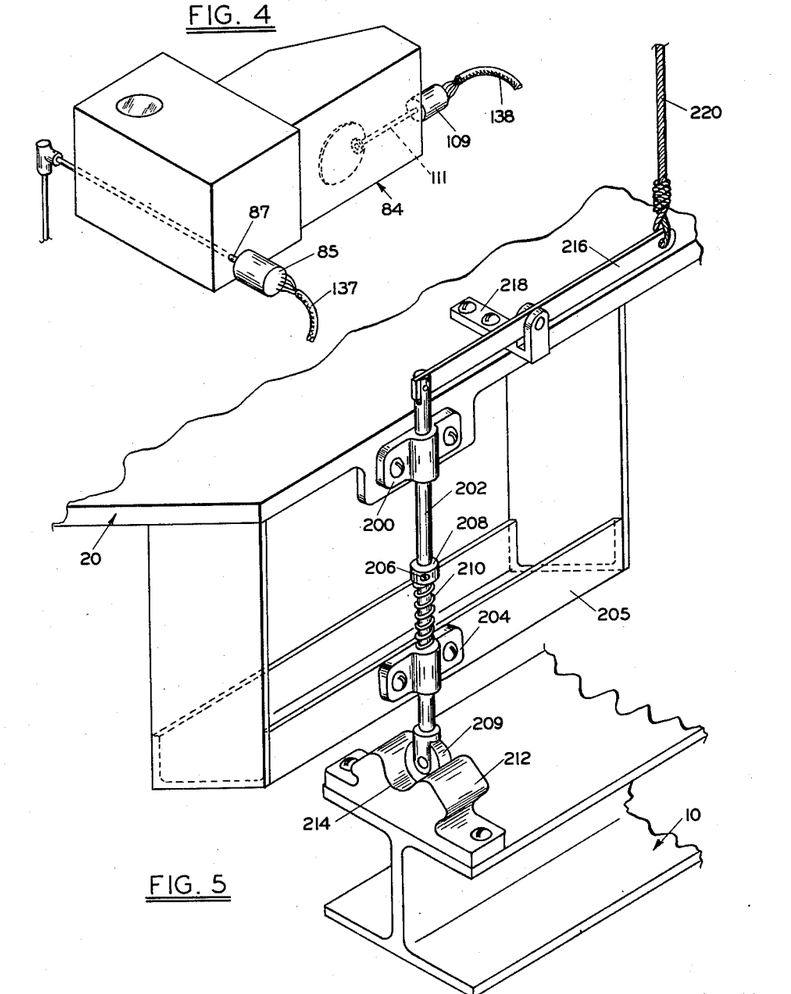
Fig. 4 is a general view of the wind drift instrument showing the transmitting teletorques which are a part thereof.
Fig. 5 is a schematic view of means for determining an assumed trainer heading.

Fig. 4 shows a general view of the wind drift instrument the construction and operation of which is described in detail in the copending application of Gunne Lowkrantz and Karl A. Kail, Serial No. 406,056 for "Wind drift instrument." This instrument contains the track transmitting teletorque designated generally in that figure by 85. This teletorque comprises the input shaft 87, and, as described in detail in the application Serial No. 406,056 this shaft is positioned by the wind drift unit in accordance with the assumed heading of the trainer, the assumed air speed of the trainer, the assumed direction of the wind and the assumed velocity of the wind, which, it will be understood, are the four factors which determine the track or path of travel of a plane over the ground in actual flight. Inasmuch as these same four factors are introduced into the wind drift instrument 84 and determine the position of the input shaft 87 of the track transmitting teletorque it will be understood that the position of the input shaft of this transmitting teletorque 85 is representative of the assumed track or path of travel over the ground of the trainer. As the position of the input shaft 87 of the track transmitting teletorque 85 is varied the output pinions 80 of the track receiving teletorques 78 are rotated in a manner well understood in the art. The pinions 80 on the output shafts of the teletorques 78 are therefore dependent upon the assumed track of the trainer, and it will be seen that as the assumed track changes, resulting in a change in the position of pinions 80, gear 76 will be rotated.

It will be seen in Figs. 2 and 3 that gear 76 meshes with two reversing gears 86 each of which is rotatably mounted upon one of the shafts 88 which are held by extensions 90 integral with the bottom of frame 70. Each of these gears 86 meshes with one of the large spur gears 92 each of which is affixed to the bottom of one of the vertical shafts 94. As seen in Fig. 3, affixed to the upper end of each of the shafts 94 by means of set screws 96 is a casting 97 which has two integral upstanding pins 99 (only one shown) in a clearance hole 101 of casting 98 and a lock nut 103 is provided to engage the upper threaded portion of pin 99. Integral with each of the castings 98 is a housing 100 and inside each of these housings is a gear train designated generally by 102. Rotatably mounted within each of the gear housings 100 is a shaft 104 upon the outer end of each of which is affixed a rubber tired driving disc 106.

From the foregoing, it will be realized that as the position of the input shaft 87 of the track transmitting teletorque 85 is varied by the wind drift instrument in accordance with the assumed track of the trainer, a rotation of the pinions 80 upon the output shafts of the track receiving teletorques 78 occurs. Spur gear 76 is therefore rotated and so are gears 86 and the large spur gears 92 upon the lower end of the vertical shafts 94. The vertical shafts 94 will be rotated as will castings 97 and pins 99 which in turn rotate the castings 98 and housings 100. The rubber tired driving discs 106 will therefore have their positions about their vertical axes changed. It should be noticed that the vertical axes of the rubber tired discs 106 are coincident with the vertical axes of vertical shafts 94. It may therefore be concluded that the position of the rubber tired driving discs 106 about their vertical axes is at all times dependent upon the assumed track or path of travel of the trainer over the ground as determined by the wind drift instrument 84.

It will be seen in Fig. 3 that the shaft 74 has suspended to its lower end a casting 75 which has two integral clamps 77, each of which holds one of the teletorques 78. Adjusting arm 79 is held in casting 75 by means of set screw 81 and, as seen in Fig. 2, the other end of this arm may be fixed relative to azimuth rail 40 by means of a screw 83 which fits in any one of the plurality of holes 89. When the power of the teletorques 78 is on, a movement of arm 79 in the horizontal plane moves the teletorques 78, and pinions 80, being held from rotating by the transmitter teletorque 85, rotate gear 76, which, through the previously described means, rotates driving discs 106 about their vertical axes.

Also seen in Fig. 3 mounted upon each of the housings 100 is a teletorque 108, these teletorques being designated in the art as the ground speed receiving teletorques. Each of these teletorques is connected to the wires in its associated cable 110 which enters the upper open end of one of the shafts 94 and makes its exit therefrom by means of one of the holes 112 drilled in these shafts. The other end of each of these wires is connected to one of the pins designated generally by 114 which in turn is electrically connected with one of the slip rings 116. Two brush blocks each designated 118 are rigidly mounted upon frame 70 and each of the brushes 120 carried by them is in contact with one of the slip rings 116. Each of the brushes 120 is connected to a wire contained in its associated cable 122 which connects with a junction box 124, seen in Fig. 2. Cable 128 goes from junction box 124 into the larger cable 126 which, as previously explained, is in a conduit 130 which runs underground to the junction box 132 upon one of the legs 12 of the trainer. From junction box 132 the electrical connection extends by means of cable 134 to the slip rings and brushes (not shown) inside the bearing housings 14 and 18. From the slip rings and brushes the electrical connection runs by means of cable 138 which connects with the ground speed transmitter teletorque of the wind drift instrument 84. This teletorque is designated in Fig. 4 by 109.

As completely described in U. S. Patent 2,359,866 issued to Gunne Lowkrantz upon October 10, 1944 for Variable speed drive apparatus the input shaft of the ground speed teletorque is rotated at a rate proportional to the assumed ground speed or speed over the ground of the trainer as determined by the wind drift instrument. Inasmuch as the ground speed transmitting teletorque is electrically connected by the aforedescribed means with ground speed receiving teletorques 108 it will be understood that the speed of rotation of the output shafts 140 of these teletorques will rotate at the same rate. By means of the gear train designated generally by 102 the rubber tired discs 106 are rotated and, therefore, their speed of rotation is proportional to the assumed ground speed of the trainer.

From the foregoing it will be realized, therefore, that the position about its vertical axis of each of the rubber tired driving discs 106 is dependent upon the assumed direction of travel of the trainer over the ground and that its rate of rotation is proportional to the assumed ground speed of the trainer.

Reference is now made to Fig. 2 which shows tracks 142 and 144 which are rigidly held by brackets 146 which in turn are rigidly affixed to the upper cross pieces of terrain base frame 48. Positioned above the tracks 142 and 144 is terrain plate carriage 148 which has two cross pieces 157 holding in the horizontal plane the shafts upon which rollers 150 are free to turn. The roller at the upper right end of Fig. 2 is not shown. Rollers 150 ride upon tracks 142 and 144 and, therefore, it will be realized that the terrain plate carriage 148 can travel transverse of terrain base frame 48. One of the tracks 142 or 144 has its upper surface in the form of an inverted V and the rollers in engagement with that track are cut complementary thereto. This arrangement prevents the terrain plate carriage from sliding longitudinally with respect to terrain base frame 48 and, therefore, always keeps the rollers 150 upon their tracks 142 and 144.

Rigidly affixed upon the front vertical face of cross piece 157 of terrain plate carriage 148 is scale 151 and rigidly affixed to track 142 is an index pointer 153. These two elements at all times indicate the position of terrain plate carriage 148 transverse of terrain base frame 48. Also attached to the vertical face of cross piece 157 are two stops 155 which engage studs 163 to prevent rollers 150 from going beyond the ends of track 142, and stop 159 may be depressed by means of handle 161 to facilitate the insertion or removal of plate 158 from carriage 148. A similar stop and handle are at the other end of carriage 148, but they are not shown.

As also seen in Fig. 2, a plurality of guide rollers 152 are mounted by means of ball bearings for rotation in the horizontal plane along the sides 154 of the terrain plate carriage 148 and, furthermore, for each of these rollers there is a companion roller 156 similarly mounted for rotation in the vertical plane. These rollers 152 and 156 engage the sides and bottom respectively of terrain plate 158 and provide a low friction track for moving terrain plate 158 longitudinally with respect to terrain plate carriage 148.

From the preceding description it will be seen, therefore, that the terrain plate carriage 148 may move transversely of terrain base frame 48 by means of rollers 150 and tracks 142 and 144, and inasmuch as the terrain plate 158 is held by terrain plate carriage 148 the terrain plate also may be moved transversely of terrain base frame 48. In addition, by means of rollers 152 and 156 the terrain plate 158 may move longitudinally with respect to terrain base frame 48. Furthermore, by means of the rollers 46 and track 42 of azimuth rail 40 the terrain base frame 48 and therefore the terrain plate 158 may be placed in any position of rotation.

Also seen in Fig. 2 is a housing 160 containing a source of light (not shown) and a condensing lens system, the last lens of which is designated 162. This housing 160 is rigidly fixed to and held by the terrain base frame 48 and casting 60 and is positioned so that the center of its projected rays is directly in the center of bearing housings 14 and 18 and, therefore, coincident with the center of rotation of the trainer. Furthermore, this center of projected rays coincides with the center of azimuth rail 40 so that regardless of the position of terrain base frame 48 relative to azimuth rail 40 the center of the projected rays still coincides with the center of rotation of the trainer. Frame 29 and terrain screen 31 are mounted so that the center of rotation of screen 31 coincides with the center of the projected rays. The final lens of the projecting system is held inside upper rotatable bearing housing 18 and is designated 164. The positioning of this lens is shown in Fig. 1. An opening 166 having a shape corresponding to the shape of the terrain screen 31 is present in the cover 168 of the bearing housing 18. It will be understood that as the trainer rotates screen 31 and cover 168 also rotates so that the projected rays always fall on the screen.

As seen in Fig. 2, the housings 100 which are attached to the upper end of vertical shafts 94 are positioned adjacent terrain plate 158 so that the rubber tired driving discs 106 may contact the under side of terrain plate 158 when the apparatus is in operable position.

Reference is now made to Figs. 2 and 3 which show an arm 170 which is rigidly affixed to a horizontal shaft 172 by means of set screw 174. Two pairs of eccentric cams 176 are rigidly affixed upon shaft 172 and these cams engage the horizontal extensions 178 of castings 180 in which the lower end of vertical shafts 182 are held. At the upper end of each of the vertical shafts 182 is a horizontal stud 184 and upon each of these studs is mounted a roller 186 which engages the smooth upper surface of the flange 188 of each of the housings 98. The pins 99, to which reference has been previously made, it will be seen, have their upper portions turned down and placed upon each of these pins is a compression spring 190, the lower end of which rests upon the larger lower end of the vertical pins 99. The upper end of each of these springs presses upwardly against the top of castings 98. Lock nuts 103, previously mentioned, may be used to regulate the compression of springs 190, and it will be understood that the compressions of springs 190 normally maintain housings 98 and, therefore, discs 106 in their uppermost position but when arm 170 is turned counterclockwise cams 176 pull vertical shafts 182 and rollers 186 downwardly, thereby compressing springs 190 and moving housings 98 and discs 106 downwardly. This disengages driving discs 106 from the underside of terrain plate 158 so that the plate may be moved freely by hand. When handle 170 is in the position shown in Fig. 3 the discs 106 are in their uppermost position, which is the position occupied by them when a problem is being run and it is desired that the terrain plate 158 be moved in accordance with the assumed track and assumed ground speed of the trainer.

As seen in Fig. 2, the housings 100 are adjacent the underside of terrain plate 158 and when arm 170 is in the position shown in Fig. 3, the rubber tired discs 106 are in contact with the lower underside of terrain plate 158. The speed of rotation of discs 106 as governed by the speed of rotation of the input shaft 111 of the ground speed transmitting teletorque 109 governs the rate of travel of the terrain plate 158 which is propelled by the rotation of discs 106. The direction of travel of terrain plate 158 depends upon the position of discs 106 about their vertical axes, which position, it will be recalled, depends upon the position of the input shaft 87 of the track transmitter teletorque 85. In the event discs 106 are in a plane parallel with the longitudinal axis of terrain base frame 48 the rotation of discs 106 will merely cause terrain plate 158 to slide back and forth on rollers 152 and 156. There will be no movement of terrain plate 158 transverse of terrain base frame 48. But in the event the discs 106 are 90° from the previously-stated position, as they are positioned in Fig. 2, terrain plate 158 will not be driven along rollers 152 and 156 but instead the terrain plate carriage 148 will travel along rails 142 and 144 by means of rollers 150. Lastly, in the event the planes of rotation of discs 106 are at an angle with the longitudinal and transverse axes of terrain plate 158 the terrain plate will move along terrain plate carriage 148 by means of rollers 152 and 156, and the terrain plate carriage 148 which, of course, carries terrain plate 158 will move along rails 142 and 144. It will be realized, therefore, that terrain plate 158 may be moved in any direction with respect to the housing 160. The terrain plate 158 preferably is a positive transparency in black and white of any portion of the earth's surface, and it will be realized therefore that as the plate 158 is moved over condensing lens 162 a movement of the images seen upon the screen will result, thereby simulating flight over the earth. The assumed direction of flight will depend upon the direction of movement of the terrain plate 158, and the speed of flight will depend upon the speed of the movement of terrain plate 158.

Reference is now made to Fig. 5 which shows the means employed in this invention for accurately determining an assumed trainer heading. As seen in that figure there is attached to a portion of rotatable platform 20 a bracket 200 which holds a vertical shaft 202, the lower end of which is held by a second bracket 204 affixed to support 205 which is attached to platform 20. Mounted upon shaft 202 and affixed thereto by set screw 206 is a stop collar 208. A compression spring 210 is between collar 208 and the bracket 204. A roller 209 is mounted in the lower end of shaft 202, and a casting 212 having a detent 214 is affixed to the right most member of base frame 10 seen in Fig. 1. Whenever roller 210 is in detent 214 the trainer is assumed to be on an east heading. Attached to the upper end of shaft 202 is lever 216 pivotally held by bracket 218 affixed to platform 20. Cable 220 from fuselage 26 attaches to the right end of lever 216 as seen in Fig. 5, and by means of this cable a student in the trainer may lock roller 209 in detent 214, and therefore, place the trainer upon a fixed assumed east heading.

The terrain mechanism shown in Fig. 2 is aligned with the screen 31 and trainer fuselage 26 in the following manner. The trainer is placed on an assumed east heading as shown in Fig. 1 and azimuth rail 40 is placed under the trainer so that the centerline of the fuselage 26 is directly above a line drawn between 90° and 270° on the azimuth rail 40, the 90° point on the azimuth rail being under the front of fuselage 26. The terrain base frame 48 is then rotated until the pointer 56 is exactly opposite the 90° mark upon azimuth rail 40, as seen in Fig. 2. It will be understood that terrain base frame 48 and terrain plate carriage 148 then extend in the same direction as the trainer fuselage 26 and screen 31. The two driving discs 106 are aligned so that their planes of rotation are parallel with each other and with the centerlines of the trainer fuselage 26, terrain plate 158, terrain plate carriage 148 and terrain base frame 48. As before stated, discs 106 are seen in Fig. 2 to be 90° from this position. The terrain plate 158 is then placed with its left end above right driving disc 106, as seen in Fig. 2, and the position of pointer 153 relative to scale 151 is observed. The wind drift instrument is adjusted for an assumed zero wind. The trainer is then flown in its locked east heading until the right end of terrain plate 158 is over the left driving disc 106 seen in Fig. 2. If the mechanism is properly synchronized the pointer 153 and the scale 151 will not have changed their relative positions. A due east heading has been flown under a condition of no wind, and, therefore, the terrain plate should move directly along an east-west line. In the event that any departure from this direct east-west travel of terrain plate 158 is shown by a reference to the pointer 153 and scale 151 the teletorque adjusting arm 79 is moved in the proper direction by removing the screw 83 which holds the end of the arm in line with the holes 89 of the azimuth rail. This adjusting process is continued until the whole length of the terrain plate travels over the lens 162 without any relative movement between pointer 153 and scale 151 when the trainer is flown on an assumed east heading.

In a plane in actual flight in the absence of wind as one looks out of the ship the ground appears to be directly approaching the plane and passing under it. To simulate this it is clear that when the trainer is flying under conditions assuming no wind the image on the screen 31 should always be directly approaching the trainer 26. Yet the preceding description stated that when the trainer is headed as shown in Fig. 1 on an assumed east heading the terrain plate moved from the rear of fuselage 26 toward the head of the fuselage. This is because in the projection system a movement of the terrain plate 158 in one direction gives a movement of the image on the screen 31 in the opposite direction. It will therefore be realized that under an assumed no wind condition the terrain plate 158 always moves in the same direction that the trainer 26 is headed. It will therefore be realized that when the trainer fuselage 26 is placed on an assumed east heading the west end of the terrain plate is foremost relative to the heading of the fuselage 26 while the east end of the plate is toward the rear of the fuselage. The north end is under the right side of the fuselage while the south end is under the left side of the fuselage. In other words the directions on the terrain plate are displaced 180° from the assumed direction of the fuselage 26. As the trainer proceeds on an assumed east heading the output of the wind drift instrument 84 rotates the input shaft 111 of ground speed transmitter teletorque 109 and, as previously explained, driving discs 106 are rotated and the terrain plate 158 is moved from the rear to the head of the trainer and the image on screen 31 moves toward trainer 26. The navigator in the trainer by referring to his map of the terrain over which the trainer is supposed to be flying can check the path of flight. In the event the trainer turns to the right simulating a turning of a plane from east toward south, as explained in the above mentioned application Serial Number 406,056, the position of the input shaft 87 of the track transmitting teletorque 85 of the wind drift instrument 84 is changed, this motion of the input shaft is transmitted to the pinions 80 of the track receiving teletorques 78, gears 76, 88 and 92 are rotated, and driving discs 106 are rotated about their vertical axes in the same direction as the rotation of the fuselage 26. The terrain plate 158 then travels on rollers 152 and 156 and the terrain plate carriage 148 moves along tracks 142 and 144 so that the resultant movement of the terrain plate 158 is in the same direction as the heading of the fuselage 26. As any other changes in the heading of the fuselage 26 occur, the input shaft 87 of the track transmitting teletorque 85 is moved by the wind drift instrument and a resultant movement of pinions 80 and the position of drive discs 106 about their vertical axes occurs, and consequently the direction of travel of terrain plate 158 is maintained correctly relative to the heading of fuselage 26.

The speed of rotation of drive discs 106, as stated above, is dependent upon the speed of rotation of the input shaft 111 of the ground speed transmitting teletorque 109, and is determined by the wind drift instrument 84.

It may therefore be concluded that my invention provides means whereby the image of the terrain as seen upon the screen 31, in the absence of an assumed wind, moves directly toward the trainer, thereby simulating the apparent movement of the terrain directly toward a plane as the plane flies ahead in the absence of any wind.

In the event a plane is flying with a wind at an angle to the longitudinal axis of the ship the ground does not appear to pass parallel to the longitudinal axis of the plane but rather comes toward the plane at an angle, the size of the angle depending upon the direction of the wind and velocity thereof. As disclosed in detail in the above mentioned copending application Serial Number 406,056, the wind drift instrument 84 comprises means whereby this instrument may be set in accordance with the assumed direction and velocity of the wind, and the position of the input shaft 87 of the track transmitting teletorque is changed accordingly. It will be realized therefore that when an assumed wind has been introduced into the wind drift instrument 84 the position of driving discs 106 about their vertical axes will be displaced from the positions they occupy when there is no assumed wind by the amount determined by the wind drift instrument 84. The direction of travel of terrain plate 158 relative to the trainer 26 and therefore the direction of travel of the image on screen 31 relative to the trainer will be varied by introducing into the wind drift instrument assumed wind conditions. For example, let us assume the mechanism has been adjusted for a due east heading of the trainer under conditions of no wind. Flight of the trainer due east will cause the terrain plate to move directly ahead of the fuselage 26 and the image on the screen 31 will move directly toward the trainer fuselage 26. But if the wind drift instrument 84 is set assuming a wind from North at a given velocity, driving discs 106 will be rotated clockwise a certain amount as seen from above in Fig. 2, and instead of terrain plate 158 moving directly from the rear of the fuselage 26 toward its head it will also have a movement from under the left of the fuselage to the right. The image on screen 31 will then approach the trainer and move to the left, just as when a plane is flying due east in a wind from North the ground appears to approach the plane and slide off to the left. In a similar manner, as disclosed in the copending application Serial Number 406,056, an assumed wind from any direction and of any velocity may be introduced in the wind drift instrument 84, and driving discs 106 will be displaced from the position they would occupy if there were no wind by an amount and in a direction dependent upon the assumed direction and velocity of the wind, and the movement of terrain plate 158 is modified so that the travel of the images upon screen 31 is modified to simulate the effects of corresponding winds upon a plane in actual flight.

It may therefore be concluded that my invention also provides means for causing the image of the terrain on the screen 31 to move with respect to the trainer flying under assumed wind conditions in the same manner that the earth moves relative to a plane flying in a wind.

Let us assume that azimuth rail 40 were not provided but that, instead, terrain base frame 48 were fixedly mounted upon the ground or floor. The direction of the longitudinal axis of the terrain base frame 48 relative to the assumed east heading of the trainer would be fixed. In the event that the longitudinal axis of the frame 48 were parallel to the longitudinal axis of the trainer 26 when it is on an assumed east heading, the terrain plate 158 would always have to simulate a strip of land laying directly east-west because in setting up a "problem" it is necessary that the assumed direction of the trainer and the direction of the terrain plate agree. It would be impossible to pick out any strip of land upon the earth's surface regardless of its direction from which to make a terrain plate if terrain base frame 48 were fixed. But with the azimuth rail 40 it is possible to copy any strip of terrain for depiction on the terrain plate 158, and, when the trainer is on an assumed east heading the terrain base frame 48 is merely rotated so that the east-west line on the terrain plate is parallel to the east-west line of the trainer 26, the western end of the terrain plate corresponding to the eastern end of the fuselage. By knowing the number of degrees that East on the terrain plate 158 is displaced from the longitudinal axis of the plate, by use of pointer 56 and the scale on the azimuth rail 40 the terrain base frame 48 may be easily correctly placed.

From the foregoing description it will be seen that my present invention comprises many improvements over my copending application Serial Number 250,958 and that the stated and other objects of my invention have been satisfied. The foregoing being but a preferred embodiment of my invention, I limit myself only by the following claims.

1. In a grounded navigation training system the combination of a support for a student rotatably mounted upon a stationary base, a screen affixed to said support for rotation therewith, and a projection system for projecting images upon said screen, the axes of rotation of said support and said screen being coincident with the center of the rays projected by said projection system.

2. In a grounded navigation training system the combination of a support for a student rotatably mounted upon a stationary base, a screen affixed to said support for rotation therewith, a projection system for projecting images upon said screen, said projection system comprising an image bearing member, and a rotatably mounted frame for holding said image bearing member.

3. In a grounded navigation training system the combination of a support for a student, a projection screen visible from said support, a projection system for projecting images onto said screen, said projection system comprising a source of light and an image bearing member, a frame for holding said image bearing member, a graduated rail for holding said frame, said frame being rotatable with respect to said graduated rail, and index means associated with said rotatable frame for cooperation with said graduated rail.

4. In a grounded navigation training system the combination of a support for a student rotatably mounted upon a stationary base, a projection screen visible from said support, a projection system for projecting images upon said screen, said projection system comprising an image bearing member, and a rotatably mounted frame for holding said image bearing member.

5. In a grounded navigation training system the combination of a support for a student, a projection screen visible from said support, a projection system for projecting images upon said screen, said projection system comprising a horizontally disposed image bearing member movable in any direction in the horizontal plane, a circular member, a frame for holding said image bearing member rotatably mounted with respect to said circular member, and index means for indicating the rotatable position of said frame with respect to said circular member.

6. In a grounded navigation training system the combination of a support for a student, a projection screen visible from said support, a projection system for projecting images upon said screen, said projecting system comprising an image bearing member movable in any direction in a horizontal plane, and a rotatably mounted frame for holding said image bearing member.

7. In a grounded navigation training system the combination of a stationary base affixed to a lower bearing housing, an upper bearing housing rotatably mounted with respect to said lower bearing housing, a support for a student affixed to said upper bearing housing for rotation therewith, a screen visible from said support and positioned above said bearing housings for receiving projected images, and a projection system for projecting images upon said screen, a portion of said projecting system being positioned below said bearing housings to project its rays through the center of said bearing housings.

8. In a grounded navigation training system the combination of a support for a student rotatably mounted upon a stationary base; a screen visible from said support for receiving projected images; a projection system for projecting images upon said screen, said projection system comprising a member bearing images in simulation of a portion of the earth's surface; means comprising a member rotatable with said support and arranged for coaction with a fixed member for ascertaining the assumed heading of said support; and means for relatively positioning said support and said image bearing member whereby the images projected upon said screen may be caused to bear the same relation relative to said trainer as the terrain simulated by said images would bear to a plane actually flying over the terrain a heading corresponding to the assumed heading of said trainer.

9. In a grounded navigation training system the combination of a support for a student rotatably mounted upon a stationary base; a screen visible from said support for receiving projected images; a projection system for projecting images upon said screen, said projection system comprising a member bearing images in simulation of a portion of the earth's surface; a frame for holding said image bearing member and a graduated rail, said frame being rotatable with respect to said graduated rail; means for ascertaining the assumed heading of said support; and means for rotating said frame and image bearing member with respect to said graduated rail whereby the images projected upon said screen may be caused to bear the same relation relative to said trainer as the terrain simulated by said images would bear to a plane actually flying over the terrain a heading corresponding to the assumed heading of said trainer.

10. In a grounded navigation training system the combination of a screen for receiving projected images; a projection system for projecting images upon said screen, said projection system comprising an image bearing member mounted for movement in any direction in a horizontal plane; a friction disc abutting the lower side of said image bearing member for moving the same; a first means for moving said friction disc about its vertical axis; and additional manually controlled means for moving said friction disc about its vertical axis.

11. In a grounded navigation training system the combination of a screen for receiving projected images; a projection system for projecting images upon said screen, said projection system comprising an image bearing member mounted for movement in any direction in a horizontal plane; a plurality of friction discs abutting the lower side of said image bearing member for moving the same; a first means for simultaneously moving said friction discs about their vertical axes; and additional manually controlled means for simultaneously moving said friction discs about their vertical axes.

12. In a grounded navigation training system the combination of a support for a student; a screen visible from said support for receiving projected images; a projection system for projecting images upon said screen, said projection system comprising an image bearing member; a friction disc normally abutting the lower side of said image bearing member for moving the same; and a manually controllable element for moving said friction disc out of engagement with said image bearing member.

13. In a grounded navigation training system the combination of a support for a student; a screen visible from said support for receiving projected images; a projection system for projecting images upon said screen, said projection system comprising an image bearing member; a plurality of friction discs normally abutting the lower side of said image bearing member for moving the same; and a manually controllable element for moving said friction discs out of engagement with said image bearing member.

14. In a grounded navigation training system the combination of a projection screen, a member bearing an image representing a portion of the earth's surface, means for projecting the image of said image bearing member on said screen, a graduated member, a frame for holding said image bearing member, said frame being rotatable with respect to said graduated member, index means on said frame arranged to cooperate with said graduated member, and means for moving said image bearing member with respect to said projecting means in a plane at right angles to the axis of rotation of said frame.

15. In a grounded navigation training system the combination of a projection screen, a member bearing an image representing a portion of the earth's surface, means for projecting the image of said image bearing member on said screen, a circular rail, a frame for holding said image bearing member rotatably mounted upon said rail, index means for indicating the rotatable position of said frame with respect to said rail, and means for moving said image bearing member with respect to said projecting means in a plane at right angles to the axis of rotation of said frame.

16. In a grounded navigation training system the combination of a stationary base, a tower rotatably mounted above said stationary base, a support for a student mounted upon the top of said tower to rotate therewith, a screen attached to said tower near the top thereof, and a projection system for projecting images upon said screen, the axes of rotation of said support and screen being coincident with the center of the rays projected by said projection system.

EDWIN A. LINK.